US011943234B2

(12) United States Patent
Varma et al.

(10) Patent No.: US 11,943,234 B2
(45) Date of Patent: Mar. 26, 2024

(54) SYSTEM AND METHOD FOR DETERMINING A VOLATILE FILE BASED ON A SELECTION FACTOR

(71) Applicant: Bank of America Corporation, Charlotte, NC (US)

(72) Inventors: Jayachandra Varma, Irving, TX (US); Ganesh Bonda, Weddington, NC (US); Sachin Lad, Santa Barbara, CA (US); Petar E. Puskarich, Murphy, TX (US)

(73) Assignee: Bank of America Corporation, Charlotte, NC (US)

( * ) Notice: Subject to any disclaimer, the term of this patent is extended or adjusted under 35 U.S.C. 154(b) by 10 days.

(21) Appl. No.: 17/649,000

(22) Filed: Jan. 26, 2022

(65) Prior Publication Data

US 2023/0239308 A1  Jul. 27, 2023

(51) Int. Cl.
| G06F 15/16 | (2006.01) |
| G06F 16/182 | (2019.01) |
| H04L 9/40 | (2022.01) |
| H04L 67/06 | (2022.01) |

(52) U.S. Cl.
CPC ........ *H04L 63/123* (2013.01); *G06F 16/1837* (2019.01); *H04L 63/0869* (2013.01); *H04L 67/06* (2013.01)

(58) Field of Classification Search
None
See application file for complete search history.

(56) References Cited

U.S. PATENT DOCUMENTS

| 8,189,852 | B2 * | 5/2012 | Cornell | G06F 16/972 |
| | | | | 382/100 |
| 9,672,499 | B2 | 6/2017 | Yang et al. | |
| 9,747,586 | B1 | 8/2017 | Romanchuk et al. | |
| 9,830,593 | B2 | 11/2017 | Myers | |
| 9,836,790 | B2 | 12/2017 | Ronca et al. | |
| 9,965,805 | B1 | 5/2018 | Greebel et al. | |
| 10,037,533 | B2 | 7/2018 | Caldera | |
| 10,102,510 | B2 | 10/2018 | Yau et al. | |
| 10,163,079 | B1 | 12/2018 | Brock et al. | |
| 10,255,600 | B2 | 4/2019 | Ronca et al. | |
| 10,275,772 | B2 | 4/2019 | Ronca et al. | |
| 10,318,938 | B2 | 6/2019 | Johnsrud et al. | |
| 10,636,033 | B2 | 4/2020 | Johnsrud et al. | |
| 10,650,376 | B1 | 5/2020 | Winklevoss et al. | |
| 10,740,844 | B2 | 8/2020 | Stradling et al. | |

(Continued)

*Primary Examiner* — Yves Dalencourt (57) ABSTRACT

An apparatus for sorting and ordering data based on filtering parameters comprises a memory operable to store a digital folder and a processor operably coupled to the memory. The processor is configured to receive a transmission comprising verification of an interaction session established between a first user and an entity and to receive file information corresponding to one or more files stored in the digital folder from an external exchange. The processor is further configured to generate a file vector comprising the one or more files of the digital folder that is sorted based on applying a selection factor to the received file information for each of the one or more files. The processor is further configured to send a transmission to a user device comprising the file vector and an indication to utilize a first file of the file vector during the interaction session.

14 Claims, 3 Drawing Sheets

(56) References Cited

U.S. PATENT DOCUMENTS

| | | |
|---|---|---|
| 10,769,602 B2 | 9/2020 | Kang |
| 10,861,112 B2 | 12/2020 | Forbes, Jr. et al. |
| 11,055,707 B2 | 7/2021 | Lingappa |
| 11,164,164 B2 | 11/2021 | Minor |
| 2004/0002935 A1* | 1/2004 | Attias ................. G06F 16/7847 |
| 2014/0279421 A1 | 9/2014 | Holman et al. |
| 2015/0220892 A1 | 8/2015 | Allen |
| 2015/0363768 A1 | 12/2015 | Melika et al. |
| 2016/0005032 A1 | 1/2016 | Yau et al. |
| 2016/0012465 A1 | 1/2016 | Sharp |
| 2016/0203477 A1 | 7/2016 | Yang et al. |
| 2017/0061396 A1 | 3/2017 | Melika et al. |
| 2017/0090738 A1* | 3/2017 | Kurtz ................... G06F 16/164 |
| 2017/0103385 A1 | 4/2017 | Wilson, Jr. et al. |
| 2017/0200137 A1 | 7/2017 | Vilmont |
| 2017/0286951 A1 | 10/2017 | Gnatchenko et al. |
| 2017/0372417 A1 | 12/2017 | Gaddam et al. |
| 2019/0005469 A1 | 1/2019 | Dhupkar et al. |
| 2019/0026705 A1 | 1/2019 | Lee |
| 2019/0080407 A1 | 3/2019 | Molinari et al. |
| 2019/0095879 A1 | 3/2019 | Eyal et al. |
| 2019/0172026 A1 | 6/2019 | Hofer et al. |
| 2019/0205873 A1 | 7/2019 | Gonzales, Jr. et al. |
| 2019/0303892 A1 | 10/2019 | Yantis et al. |
| 2020/0175601 A1 | 6/2020 | Letourneau |
| 2021/0264387 A1 | 8/2021 | Frolov et al. |

\* cited by examiner

SYSTEM AND METHOD FOR DETERMINING A VOLATILE FILE BASED ON A SELECTION FACTOR

TECHNICAL FIELD

The present disclosure relates generally to determining a file for an interaction between a user device and an entity device. More particularly, in certain embodiments, the present disclosure is related to a system and method for determining a volatile file based on a selection factor.

BACKGROUND

A plurality of files of a user can be stored electronically in a digital folder within an external system. A user can access these files through a user device. In conducting an interaction with an entity, the user is not able to analyze the plurality of files to determine which one of the plurality of files would provide a greater value of utility to the user than the remaining files in the interaction with the entity.

SUMMARY

Previous technology used for analyzing a plurality of files associated with a user suffers from disadvantages. For example, previous technology can be inefficient and provides little or no insights into the relative importance of a given file for meeting the needs of users, businesses, working groups, or the like. Previous technology is unable to automatically identify an optimal file that provides a greater value of utility to a user in comparison to the remaining files in the context of conducting an interaction with an entity. In this example, this disclosure recognizes that the plurality of files may be stored in a digital folder within an external system, where the user may access a portion of the digital folder remotely through a user device. The user device may not have enough resources to store the entirety of the plurality of files of the digital folder. Further, when conducting an interaction with an entity, the user may not know which one of the plurality of files to utilize in order to optimize a maximum value. This can result in an opportunity loss for the user when conducting an interaction with an entity. Previous technology lacks the ability to determine which file for the user to utilize in an interaction with the entity based on a selection factor and user preferences and to display that file to the user via the user device.

Certain embodiments of this disclosure provide unique solutions to technical problems of previous technology, including those problems identified above, by providing tools for reliably and efficiently determining relative prioritizations for files used in interactions between users and entities, for example, such that the user can proceed with implementing a file with a maximum utility value when conducting an interaction with an entity. For example, the disclosed system provides several technical advantages over previous technology, which include: (1) technology for generating and transmitting file vectors for display through a user device, where the user device is configured to conserve computer resources, and usage is more efficient, as the processing is done external to the user device; (2) technology for analyzing a plurality of files to determine an optimal file to use in an interaction, where such an analysis is determined through a selection factor and user preferences; and (3) facilitating conversion to an acceptable file if a determined file is not accepted by an entity during an interaction. As such, this disclosure may improve the function of computer systems used to help manage a plurality of files and associated hardware infrastructures, such that, for example, the appropriate hardware or user action (e.g., processing, memory, and networking resources) can be made available for other prioritized operations.

In general, computer resources and bandwidth of previous technology have not been allocated to analyze a plurality of files stored in a digital folder to identify an optimal file to be used by a user in an interaction with an entity. The disclosed server may improve the usage of computer resources by identifying the optimal file through systems and methods not previously utilized by conventional processes and technologies.

As such, this disclosure may improve the function of computing systems used for determining a volatile file based on a selection factor and user preferences. The disclosed system may be integrated into a practical application of generating a file vector for transmission and display to the user through a user device, wherein the user may conduct an interaction after visually processing the displayed file vector. The system improves efficiency by generating the vector at an external system and increasing availability of the processing resources of the user device for other operations.

The disclosed system may further be integrated into an additional practical application of improving underlying operations of computing systems tasked to oversee digital folders of one or more users. For example, the disclosed system may reduce processing, memory, and time resources of a user device for identifying an optimal file to be used within each digital folder for each potential interaction. A separate server may analyze file information for the files in the digital folder and then may generate a sorted vector with an indication of which file to utilize by the user device.

In an embodiment, an apparatus for sorting and ordering data based on filtering parameters comprises a memory and a processor. The memory is operable to store a digital folder associated with a first user, wherein the digital folder comprises one or more files associated with the first user. The processor is operably coupled to the memory for parsing through one or more files stored in the memory. The processor is configured to receive a transmission comprising verification of an interaction session established between the first user and an entity and to receive file information corresponding to the one or more files stored in the digital folder. The processor is further configured to generate a file vector comprising the one or more files of the digital folder that is sorted based on applying a selection factor to the received file information for each of the one or more files. The processor is further configured to send a transmission to a user device associated with the first user comprising the file vector and an indication to utilize a first file of the file vector in an interaction between the first user and the entity during the interaction session and to conduct the interaction during the interaction session between the first user and the entity in response to receiving authorization from the first user.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Figure 1:
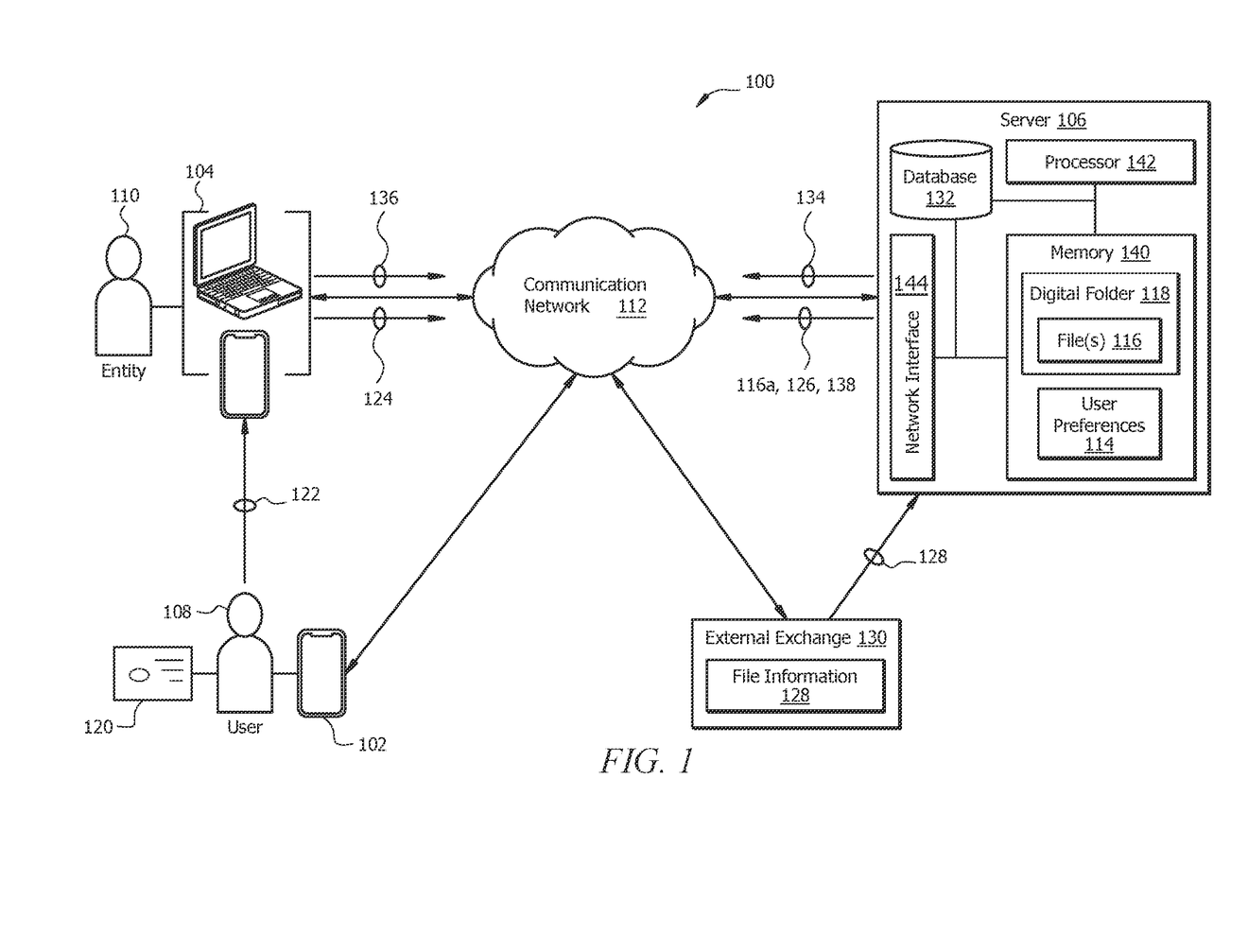
FIG. 1 is a schematic diagram of an example system for determining a volatile file based on a selection factor.
Figure 2:
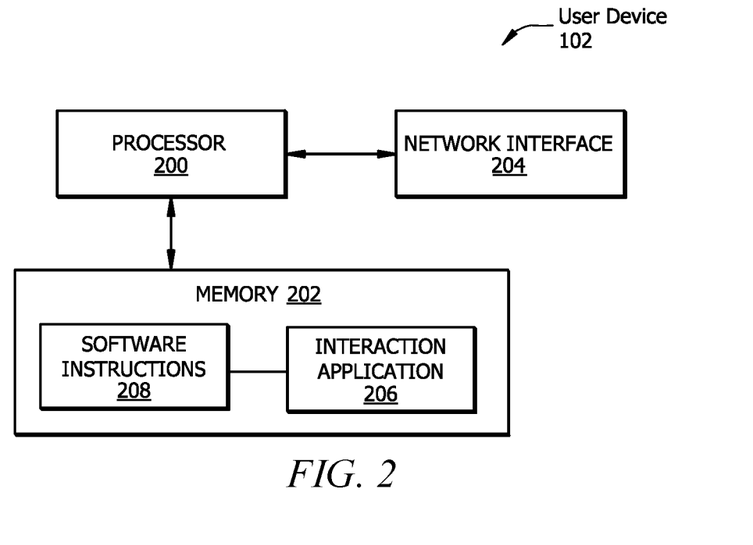
FIG. 2 is a block diagram of an example user device of the system of FIG. 1.
Figure 3:
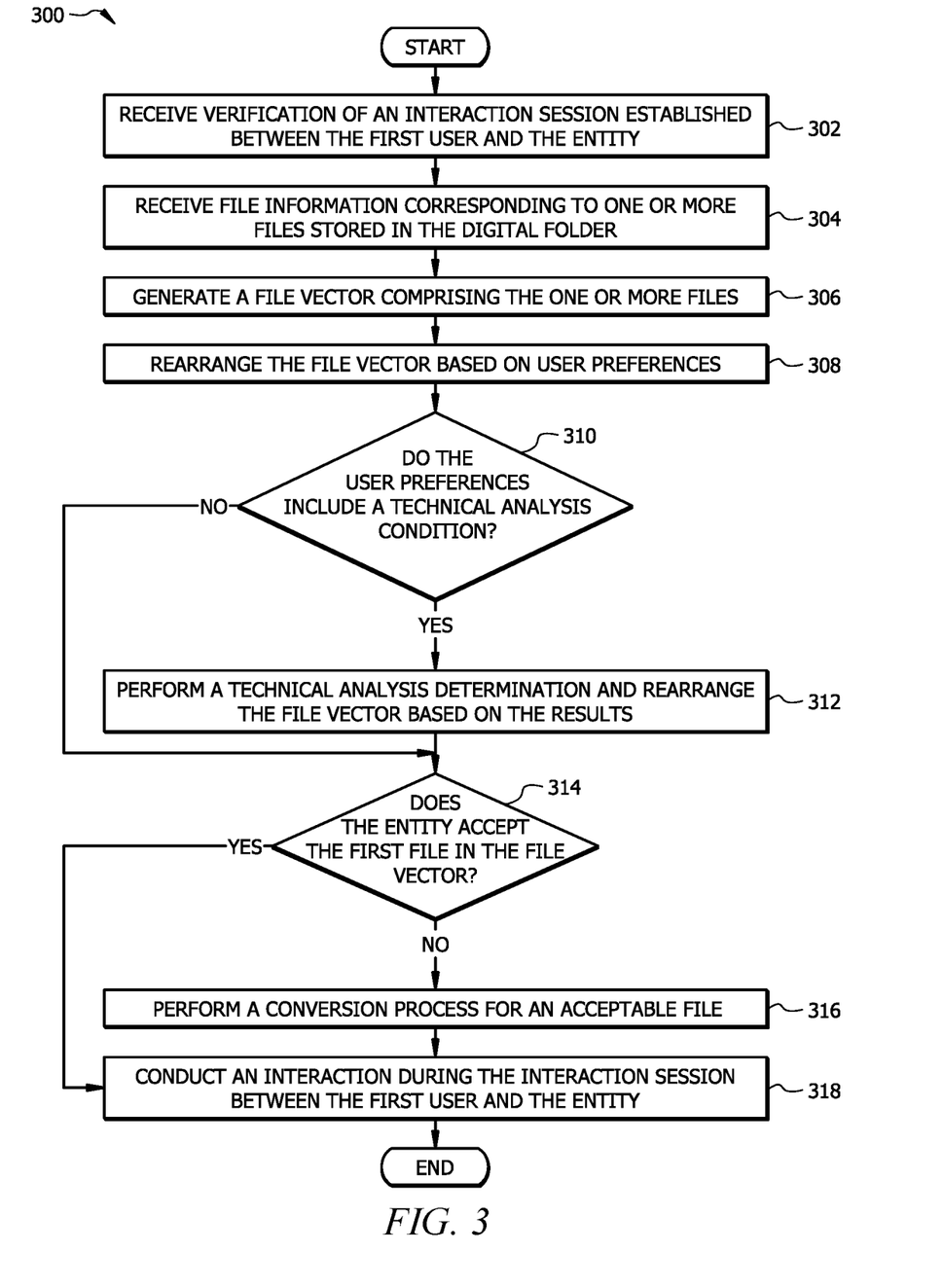
FIG. 3 is a flow diagram illustrating an example operation of the system of FIG. 1.

This disclosure provides solutions to the aforementioned and other problems of previous technology by determining a volatile file based on a selection factor. FIG. 1 is a schematic diagram of an example system for determining a volatile file based on a selection factor. FIG. 2 is a block diagram of an example user device of the system of FIG. 1. FIG. 3 is a flow diagram illustrating an example operation of the system of FIG. 1.

Example System for Determining a Volatile File Based on a Selection Factor

FIG. 1 illustrates a schematic diagram of an example system 100 for determining a volatile file based on a selection factor. The system 100 may include a first user device 102, a first entity device 104, and a server 106, wherein a first user 108 is associated with the first user device 102, and wherein a first entity 110 is associated with the first entity device 104. The system 100 may be communicatively coupled to a communication network 112 and may be operable to transmit data between the first user device 102, first entity device 104, and the server 106 through the communication network 112. In general, the server 106 may perform an identification process with the first user device 102. In particular embodiments, this process utilizes user preferences 114 to determine which one of one or more files 116 contained within a digital folder 118, associated with the first user 108, for the first user 108 to utilize in an interaction with the first entity 110. The determined one of the one or more files 116 may be transmitted to the first user device 102 as an indication to be displayed for the first user 108.

For example, the first user 108 may be attempting to conduct an interaction with the first entity 110 via the first entity device 104. In another example, the first user 108 may be attempting to conduct an interaction with the first entity 110 via a card 120 (e.g., a credit card, debit card, or any other suitable cards) associated with the first user 108. In both examples, the first entity device 104 and the card 120 may be associated with the digital folder 118 of the first user 108, wherein the first user 108 may be attempting to utilize one of the one or more files 116 contained within the digital folder 118 to conduct the interaction with the first entity 110. Without limitations, the one or more files 116 stored in the digital folder 118 may include various digital assets (for example, Bitcoin, Ethereum, Solana, Cardano, Ripple, and the like). In embodiments, a digital asset may be a collection of binary data which is designed to work as a medium of exchange and is built on blockchain technology protocols. Records of each digital asset may be stored in a digital ledger, such as a computerized database using cryptography to secure a change in the records. As the value of each digital asset may be volatile, the first user 108 may not know which one of the various digital assets stored in the digital folder 118 has the greatest value of utility to be utilized in the interaction with the first entity 110 (for example, which one has the highest value in view of an acceptable reference, such as USD).

In this example, the first entity device 104 may receive a signal 122 transmitted by the first user device 102 requesting to initiate an interaction session with the first entity device 104. The first user device 102 may be communicatively coupled to the first entity device 104. The first user device 102 may establish a peer-to-peer connection with the first entity device 104 through near field communications (NFC), Bluetooth, Wi-Fi, or combinations thereof. In another embodiment, the first user device 102 may be operable to scan an identification item near the first entity device 104 to transmit the signal 122, wherein the identification item is at least one of a barcode, a Quick Response (QR) code, a coded image, or a coded text. The first entity device 104 may then transmit a signal 124 verifying an established interaction session with the first user device 102 to the server 106. The server 106 may determine which one of the one or more files 116, associated with the first user 108, for the first user 108 to utilize in the interaction with the first entity 110 within the established interaction session.

The server 106 may be operable to generate a file vector 126 based on the user preferences 114 stored in the server 106 and on file information 128 for each of the one or more files 116. The file information 128 may be transmitted to the server 106 from an external exchange 130 operable to generate and maintain the file information 128. Upon receiving the transmitted file information 128, the server 106 may store the file information 128 within a database 132. In embodiments, the server 106 may receive and store file information 128 from the external exchange 130 in periodic time intervals, in real-time, when the signal 124 verifying an established interaction session is received, and any combination thereof. Without limitations, the file information 128 may include a value of each of the one or more files 116 in view of an acceptable reference (i.e., USD) at the time of transmission to the server 106.

The server 106 may initially sort the file vector 126 based on applying a selection factor to the received file information 128 for each of the one or more files 116. In embodiments, the selection factor may be a spot-value at approximately a time of the interaction session. For example, the file vector 126 may be sorted to display a listing of the one or more files 116, wherein a first file 116a comprises the highest spot-value and each subsequent file 116 comprises the next highest spot-value in a descending order, at a time of the server 106 receiving the signal 124 verifying an established interaction session. Once generated, the server 106 may determine which one of the one or more files 116 in the file vector 126 to be utilized by the first user 108 by performing secondary rearranging or sorting based on the stored user preferences 114.

For example, the user preferences 114 may include absolute conditions, such as to never utilize Ethereum while conducting an interaction with the first entity 110. The user preferences 114 may further include relative conditions between the one or more files 116, such as to prioritize using Ripple over Solana for an interaction with the first entity 110. In further embodiments, the user preferences 114 may include technical analysis conditions related to trends, chart patterns, volume indicators, momentum indicators, oscillators (for example, relative strength index), moving averages, support and resistance levels, and any combination thereof. For example, the user preferences 114 may include rearranging the generated file vector 126 in a descending order from the first file 116a comprising the highest percentage value above its moving average (i.e., at a spot-value 15% above the moving average). In other embodiments, user preferences 114 may include choosing which file 116 would maximize potential rewards, points, and/or benefits.

The server 106 may access the database 132 storing the received file information 128, perform a technical analysis determination, based on the user preference 114, on the file information 128 for each of the one or more files 116 in the generated file vector 126, and rearrange the generated file vector 126 based on the technical analysis determination. The server 106 may then send a signal 134 to the first entity device 104 requesting verification that the first file 116a is acceptable during the interaction session. For example, the first file 116a may be designated as Ethereum, but the first entity 110 may not accept Ethereum for an interaction with the first user 108. The first entity device 104 may transmit a signal 136 that either verifies or does not verify that the first file 116a is acceptable during the interaction session. If the signal 136 does not verify that the first file 116a is acceptable during the interaction session, the server 106 may perform an internal conversion process. In embodiments, the conversion process may comprise of assigning a value to the first file 116a with reference to an acceptable file and converting the first file 116a to the acceptable file for the assigned value. An acceptable file may be any suitable file accepted by the first entity 110. In an example, the acceptable file may be USD or another digital asset, such as Bitcoin. The server 106 may then designate the converted, acceptable file as the first file 116a and transmit a signal 138 comprising the file vector 126 and an indication to utilize the first file 116a of the file vector 126 in an interaction between the first user 108 and the first entity 110 during the interaction session.

In embodiments wherein the signal 136 does verify that the first file 116a is acceptable during the interaction session, the server 106 may transmit the signal 138 without performing the conversion process. The first user 108 may authorize the server 106 to use the first file 116a, and the server 106 may conduct the interaction during the interaction session between the first user 108 and the first entity 110 in response to receiving the authorization from the first user 108.

The server 106 is generally a suitable server (e.g., including a physical server and/or virtual server) operable to store data in a memory 140 and/or provide access to application(s) or other services. The server 106 may be a backend server associated with a particular group that facilitates conducting interactions between entities and one or more users. Details of the operations of the server 106 are described in conjunction with FIG. 3. Memory 140 includes software instructions that, when executed by a processor 142, cause the server 106 to perform one or more functions described herein. Memory 140 may be volatile or non-volatile and may comprise a read-only memory (ROM), random-access memory (RAM), ternary content-addressable memory (TCAM), dynamic random-access memory (DRAM), and static random-access memory (SRAM). Memory 140 may be implemented using one or more disks, tape drives, solid-state drives, and/or the like. Memory 140 is operable to store software instructions, the digital folder 118, user preferences 114, and/or any other data or instructions. The software instructions may comprise any suitable set of instructions, logic, rules, or code operable to execute the processor 142. In these examples, the processor 142 may be communicatively coupled to the memory 140 and may access the memory 140 for these determinations.

Digital folder 118 comprises a database of one or more items associated with the first user 108. For example, digital folder 118 may include one or more files 116, each comprising a digital asset. Thus, in one embodiment, the digital folder 118 may be a digital wallet or the like. In embodiments, one or more of the files 116 may be used for an electronic interaction. Digital folder 118 may comprise a control component (e.g., control software) and a data component (e.g., database of items). The control component may provide security and encryption for the data component and for external communications with other systems, such as electronic interaction systems, or other devices, such as first user device 102. Digital folder 118 may be stored in memory 140 of the server 106. First user 108 may possess a user device, such as the first user device 102, configured to access the digital folder 118.

Processor 142 comprises one or more processors operably coupled to the memory 140. The processor 142 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1 and 3. For example, the processor 142 may be configured to perform the steps of method 300 as described in FIG. 3.

As illustrated, the server 106 may further comprise a network interface 144. Network interface 144 is configured to enable wired and/or wireless communications (e.g., via communication network 112). The network interface 144 is configured to communicate data between the server 106 and other devices (e.g., first user device 102), databases, systems, or domain(s). For example, the network interface 144 may comprise a WIFI interface, a local area network (LAN) interface, a wide area network (WAN) interface, a modem, a switch, or a router. The processor 142 is configured to send and receive data using the network interface 144. The network interface 144 may be configured to use any suitable type of communication protocol as would be appreciated by one of skill in the art.

The communication network 112 may facilitate communication within the system 100. This disclosure contemplates the communication network 112 being any suitable network operable to facilitate communication between the first user device 102, first entity device 104, and the server 106. Communication network 112 may include any interconnecting system capable of transmitting audio, video, signals, data, messages, or any combination of the preceding. Communication network 112 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In other embodiments, system 100 may not have all of the components listed and/or may have other elements instead of, or in addition to, those listed above.

The first user device 102 may be any computing device configured to communicate with other devices, such as other user devices 102, servers (e.g., server 106), databases, etc. through the communication network 112. The first user device 102 may be configured to perform specific functions described herein and interact with entities 110, e.g., via its user interfaces. Examples of a first user device 102 include but are not limited to mobile phones, wearable devices, tablet computers, laptop computers, servers, etc. In one example, a particular first user device 102 (associated with a particular user 108) may be a smartphone or wearable device that is operable to initiate an interaction session to conduct an interaction with the first entity 110. Typically, the first user 108, who is a client of an organization, may access first user's files on an interaction application (for example, interaction application 206 in FIG. 2) from the first user device 102. First user device 102 is described in more detail below in FIG. 2.

The first entity device 104 may be any suitable device for facilitating an interaction with the first user 108. For example, first entity device 104 may be a register, a tablet, a phone, a laptop, a personal computer, a terminal, etc. The first entity device 104 may be operable to receive information from a user and/or card when an interaction is requested. The first entity device 104 then may proceed to process the requested interaction. The first entity device 104 may include any appropriate device for communicating with components of system 100 over the communication network 112. As an example and not by way of limitation, first entity device 104 may include a computer, a laptop, a wireless or cellular telephone, an electronic notebook, a personal digital assistant, a tablet, or any other device capable of receiving, processing, storing, and/or communicating information with other components of system 100. This disclosure contemplates first entity device 104 being any appropriate device for sending and receiving communications over communication network 112. The first entity device 104 may also include a user interface, such as a display, a microphone, keypad, or other appropriate terminal equipment usable by a user and/or the first entity 110. In some embodiments, an application executed by first entity device 104 may perform the functions described herein. As illustrated, the first entity device 104 may be associated with the first entity 110. The first entity 110 may be an individual that provides items or services to the first user 108 in exchange for resources.

Example User Device

FIG. 2 is an example of the first user device 102 of FIG. 1. While the present example is described as the first user device 102, FIG. 2 can be illustrative of any suitable user device 102. The first user device 102 may include a processor 200, a memory 202, and a network interface 204. The first user device 102 may be configured as shown or in any other suitable configuration.

The processor 200 comprises one or more processors operably coupled to the memory 202. The processor 200 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 200 may be a programmable logic device, a microcontroller, a microprocessor, or any suitable combination of the preceding. The processor 200 is communicatively coupled to and in signal communication with the memory 202 and the network interface 204. The one or more processors are configured to process data and may be implemented in hardware or software. For example, the processor 200 may be 8-bit, 16-bit, 32-bit, 64-bit or of any other suitable architecture. The processor 200 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1-3. In some embodiments, the function described herein is implemented using logic units, FPGAs, ASICs, DSPs, or any other suitable hardware or electronic circuitry.

The memory 202 is operable to store any of the information described with respect to FIGS. 1-3 along with any other data, instructions, logic, rules, or code operable to implement the function(s) described herein when executed by processor 200. For example, the memory 202 may store code for application(s) (for example, for an interaction application 206), and/or software instructions 208, which are described below with respect to FIG. 3. The memory 202 comprises one or more disks, tape drives, or solid-state drives, and may be used as an over-flow data storage device, to store programs when such programs are selected for execution, and to store instructions and data that are read during program execution. The memory 202 may be volatile or non-volatile and may comprise read-only memory (ROM), random-access memory (RAM), ternary content-addressable memory (TCAM), dynamic random-access memory (DRAM), and static random-access memory (SRAM).

Interaction application 206 may be a software application, a mobile application, a web application, and/or a software infrastructure associated with an organization. The interaction application 206 is configured to provide a user interface to enable the first user 108 (referring to FIG. 1) to access first user's bank files, records, transfers to and from other users 108, requests to the organization, etc. In one example, the interaction application 206 may be a web application on a website. In this example, the first user 108 may access first user's bank files (via the interaction application 206) on the website once the first user 108 is authenticated, e.g., by entering first user's username and password. In another example, the interaction application 206 may be a mobile application that is installed on the first user device 102, such as a smartphone or a wearable device. In this example, the first user 108 may access first user's files (via the interaction application 206) when the first user 108 is authenticated, e.g., by entering first user's username and password on the interaction application 206. In embodiments, the server 106 (referring to FIG. 1) may be associated with the interaction application 206. The first user device 102 may transmit authorization to the server 106 through the communication network 112 (referring to FIG. 1) in order to conduct an interaction with the first entity device 104 (referring to FIG. 1) with the determined first file 116a (referring to FIG. 1).

The network interface 204 is configured to enable wired and/or wireless communications. The network interface 204 is configured to communicate data between the first user device 102 and other network devices, systems, or domain (s). For example, the network interface 204 may comprise a WIFI interface, a local area network (LAN) interface, a wide area network (WAN) interface, a modem, a switch, or a router. The processor 200 is configured to send and receive data using the network interface 204. The network interface 204 may be configured to use any suitable type of communication protocol as would be appreciated by one of skill in the art.

Example Operation of the System for Determining a Volatile File Based on a Selection Factor FIG. 3 is a flow diagram illustrating an example method 300 of the system 100 of FIG. 1. The method 300 may be implemented using the first user device 102, the first entity device 104, and the server 106 of FIG. 1. The method 300 may begin at step 302 where the first entity device 104 (referring to FIG. 1) may transmit the signal 124 (referring to FIG. 1) to the server 106 (referring to FIG. 1) verifying an established interaction session with the first user 108 (referring to FIG. 1). In embodiments, the first user 108 may have initiated an interaction session with the first entity 110 (referring to FIG. 1) by providing the card 120 (referring to FIG. 1) to the first entity 110 or by transmitting the signal 122 (referring to FIG. 1) to the first entity device 104 via the first user device 102 (referring to FIG. 1). The card 120 may be associated with the server 106 and operable to identify the first user 108 to the server 106. In addition, the first user device 102 may be operable to identify the first user 108 to the server 106. The processor 142 (referring to FIG. 1) of the server 106 may be operable to receive the transmission from the first entity device 104.

At step 304, the processor 142 of the server 106 may receive the file information 128 (referring to FIG. 1) corresponding to the one or more files 116 (referring to FIG. 1) stored in the digital folder 118 (referring to FIG. 1). For example, the one or more files 116 may include various digital assets (for example, Bitcoin, Ethereum, Solana, Cardano, Ripple, and the like) associated with the first user 108. Without limitations, the file information 128 may include a value of each of the one or more files 116 in view of an acceptable reference (i.e., USD) at the time of transmission to the server 106 (for example, the value of Bitcoin in USD at the time of the established interaction session). The file information 128 may be transmitted to the server 106 from the external exchange 130 (referring to FIG. 1), which is operable to generate and maintain the file information 128. Upon receiving the transmitted file information 128, the processor 142 may store the file information 128 within the database 132 (referring to FIG. 1). In embodiments, the processor 142 may receive and store file information 128 from the external exchange 130 in periodic time intervals, in real-time, when the signal 124 verifying an established interaction session is received, and any combination thereof.

At step 306, the processor 142 of the server 106 may generate the file vector 126 (referring to FIG. 1) based on the received file information 128. The processor 142 of the server 106 may sort the one or more files 116 within the file vector 126 based on applying a selection factor to the received file information 128 for each of the one or more files 116. In embodiments, the selection factor may be a spot-value at approximately a time of the interaction session. For example, the file vector 126 may be sorted to display a listing of the one or more files 116, wherein the first file 116a (referring to FIG. 1) comprises the highest spot-value and each subsequent file 116 comprises the next highest spot-value in a descending order, at a time of the server 106 receiving the signal 124 verifying an established interaction session.

At step 308, the processor 142 of the server 106 may rearrange the generated file vector 126 based on user preferences 114 (referring to FIG. 1) stored in the memory 140 (referring to FIG. 1) of the server 106. Without limitations, the user preferences 114 may include absolute conditions, relative conditions between one or more files 116, technical analysis conditions, and any combination thereof.

At step 310, the processor 142 of the server 106 may determine whether the user preferences 114 include technical analysis conditions. If there is a determination that the user preferences 114 do include technical analysis conditions, the method 300 proceeds to step 312. Otherwise, the method 300 proceeds to step 314.

At step 312, in response to a determination that the user preferences 114 do include technical analysis conditions, the processor 142 of the server 106 may be operable to perform a technical analysis determination. The processor 142 may access the database 132 storing the file information 128 and analyze the file information 128 for each of the one or more files 116 within the generated file vector 126. For example, the user preferences 114 may include rearranging the generated file vector 126 in a descending order from the first file 116a comprising the highest percentage value above its moving average (i.e., at a spot-value 15% above the 10-day moving average). The processor 142 may determine the moving average of each of the one or more files 116 of the file vector 126 and compare each spot-value to the respective moving average. The processor 142 may then rearrange the generated file vector 126 based on the technical analysis determination. The method 300 then proceeds to step 314.

At step 314, the processor 142 of the server 106 may determine whether the first entity 110 would accept the determined first file 116a during the interaction within the interaction session with the first user 108. If there is a determination that the first entity 110 would not accept the determined first file 116a, the method 300 proceeds to step 316. Otherwise, the method 300 proceeds to step 318.

At step 316, in response to a determination that the first entity 110 would not accept the determined first file 116a, the processor 142 of the server 106 may perform an internal conversion process. In embodiments, the conversion process may comprise of assigning a value to the first file 116a with reference to an acceptable file and converting the first file 116a to the acceptable file for the assigned value. An acceptable file may be any suitable file accepted by the first entity 110. In an example, the acceptable file may be USD or another digital asset, such as Bitcoin. In this example, the processor 142 may determine that 1 unit of Ethereum has the same value as 0.06 Bitcoin or 3,200 USD (the assigned value) and convert the Ethereum to Bitcoin or USD to be used in the interaction. The processor 142 may then designate the converted, acceptable file as the first file 116a. The method 300 then proceeds to step 318.

At step 318, the processor 142 of the server 106 may transmit the file vector 126 and an indication to utilize the first file 116a to the first user device 102 in the interaction between the first user 108 and the first entity 110 during the interaction session. In embodiments wherein there is a determination in step 314 that the first entity 110 would accept the determined first file 116a, the processor 142 of the server 106 may transmit the file vector 126 and the indication of the first file 116a without performing the conversion process. The first user 108 may then authorize the server 106 to use the first file 116a via the interaction application 206 (referring to FIG. 2), and the processor 142 of the server 106 may conduct the interaction during the interaction session between the first user 108 and the first entity 110 with the determined first file 116a. The method 300 then proceeds to end.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus for sorting and ordering data based on filtering parameters, comprising:
   a memory operable to store a digital folder associated with a first user, wherein the digital folder comprises a plurality of files associated with the first user; and
   a processor operably coupled to the memory for parsing through the plurality of files stored in the memory, configured to:
      receive a transmission comprising verification of an interaction session established between the first user and an entity;
      receive file information corresponding to the plurality of files stored in the digital folder;
      generate a file vector comprising the plurality of files of the digital folder, the plurality of files corresponding to a plurality of digital assets, wherein generating the file vector comprises sorting the plurality of files based on applying a selection factor to the received file information corresponding to each of the plurality of files;
      send a request to an entity device associated with the entity for verification that a first file of the file vector is acceptable during the interaction session, wherein the first file corresponds to a first digital asset;
      receive a response signal from the entity device indicating that the first file is acceptable during the interaction session or the first file is not acceptable during the interaction session;
      perform a conversion process in response to receiving the response signal indicating that the first file is not acceptable during the interaction session, the conversion process comprising:
         assigning a value to the first file with reference to an acceptable file, wherein the acceptable file corresponds to an acceptable digital asset different from the first digital asset;
         converting the first file to the acceptable file for the assigned value, wherein converting the first file to the acceptable file corresponds to converting the first digital assert to the acceptable digital asset; and
         sending a request to a user device associated with the first user for authorization to use the acceptable file for the interaction during the interaction session;
      send a transmission to the user device associated with the first user comprising the file vector and an indication to utilize the acceptable file of the file vector in an interaction between the first user and the entity during the interaction session; and
      conduct the interaction during the interaction session between the first user and the entity in response to receiving authorization from the first user.

2. The apparatus of claim 1, wherein the processor is further configured to:
   rearrange the generated file vector based, at least in part, on user preferences.

3. The apparatus of claim 2, wherein the processor is further configured to:
   access a database operable to store the received file information;
   perform a technical analysis determination on the received file information for each of the plurality of files in the generated file vector; and
   rearrange the generated file vector based on the technical analysis determination.

4. The apparatus of claim 1, wherein the processor is further configured to:
   send a request to the user device for authorization to use the first file for the interaction during the interaction session in response to receiving the response signal from the entity device indicating that the first file is acceptable during the interaction session.

5. The apparatus of claim 1, wherein the selection factor is a spot-value at approximately a time of the interaction session.

6. A method for sorting and ordering data based on filtering parameters, comprising:
   receiving a transmission comprising verification of an interaction session established between a first user and an entity;
   receiving file information corresponding to a plurality of files stored in a digital folder associated with the first user;
   generating a file vector comprising the plurality of files of the digital folder, the plurality of files corresponding to a plurality of digital assets, wherein generating the file vector comprises sorting the plurality of files based on applying a selection factor to the received file information corresponding to each of the plurality of files;
   sending a request to an entity device associated with the entity for verification that a first file of the file vector is acceptable during the interaction session, wherein the first file corresponds to a first digital asset;

receiving a response signal from the entity device indicating that the first file is acceptable during the interaction session or the first file is not acceptable during the interaction session;

performing a conversion process in response to receiving the response signal indicating that the first file is not acceptable during the interaction session, the conversion process comprising:

assigning a value to the first file with reference to an acceptable file, wherein the acceptable file corresponds to an acceptable digital asset different from the first digital asset;

converting the first file to the acceptable file for the assigned value, wherein converting the first file to the acceptable file corresponds to converting the first digital assert to the acceptable digital asset; and sending a request to a user device associated with the first user for authorization to use the acceptable file for the interaction during the interaction session;

sending a transmission to the user device associated with the first user comprising the file vector and an indication to utilize the acceptable file of the file vector in an interaction between the first user and the entity during the interaction session; and conducting the interaction during the interaction session between the first user and the entity in response to receiving authorization from the first user.

7. The method of claim 6, further comprising rearranging the generated file vector based, at least in part, on user preferences.

8. The method of claim 7, further comprising:
accessing a database operable to store the received file information;
performing a technical analysis determination on the received file information for each of the plurality of files in the generated file vector; and
rearranging the generated file vector based on the technical analysis determination.

9. The method of claim 6, further comprising:
sending a request to the user device for authorization to use the first file for the interaction during the interaction session in response to receiving the response signal from the entity device indicating that the first file is acceptable during the interaction session.

10. The method of claim 6, wherein the selection factor is a spot-value at approximately a time of the interaction session.

11. A non-transitory computer-readable medium comprising instructions that are configured, when executed by a processor of a server, to:
receive a transmission comprising verification of an interaction session established between a first user and an entity;
receive file information corresponding to a plurality of files stored in a digital folder associated with the first user;
generate a file vector comprising the plurality of files of the digital folder, the plurality of files corresponding to a plurality of digital assets, wherein generating the file vector comprises sorting the plurality of files based on applying a selection factor to the received file information corresponding to each of the plurality of files, wherein the selection factor is a spot-value at approximately a time of the interaction session;
send a request to an entity device associated with the entity for verification that a first file of the file vector is acceptable during the interaction session, wherein the first file corresponds to a first digital asset;
receive a response signal from the entity device indicating that the first file is acceptable during the interaction session or the first file is not acceptable during the interaction session;
perform a conversion process in response to receiving the response signal indicating that the first file is not acceptable during the interaction session, the conversion process comprising:
assigning a value to the first file with reference to an acceptable file, wherein the acceptable file corresponds to an acceptable digital asset different from the first digital asset;
converting the first file to the acceptable file for the assigned value, wherein converting the first file to the acceptable file corresponds to converting the first digital assert to the acceptable digital asset; and
sending a request to a user device associated with the first user for authorization to use the acceptable file for the interaction during the interaction session;
send a transmission to Rail the user device associated with the first user comprising the file vector and an indication to utilize the acceptable file of the file vector in an interaction between the first user and the entity during the interaction session; and
conduct the interaction during the interaction session between the first user and the entity in response to receiving authorization from the first user.

12. The non-transitory computer-readable medium of claim 11, wherein the instructions are further configured to:
rearrange the generated file vector based, at least in part, on user preferences.

13. The non-transitory computer-readable medium of claim 12, wherein the instructions are further configured to:
access a database operable to store the received file information;
perform a technical analysis determination on the received file information for each of the plurality of files in the generated file vector; and
rearrange the generated file vector based on the technical analysis determination.

14. The non-transitory computer-readable medium of claim 11, wherein the instructions are further configured to:
send a request to the user device for authorization to use the first file for the interaction during the interaction session in response to receiving the response signal from the entity device indicating that the first file is acceptable during the interaction session.

* * * * *